United States Patent [19]

Hilzendeger et al.

[11] 4,322,231
[45] Mar. 30, 1982

[54] FILTER ELEMENT LOCKING MECHANISM

[75] Inventors: Joseph J. Hilzendeger, Carson; Kunio Masuda, Pomona, both of Calif.

[73] Assignee: Farr Company, El Segundo, Calif.

[21] Appl. No.: 159,784

[22] Filed: Jun. 16, 1980

[51] Int. Cl.³ .............................................. B01D 46/00
[52] U.S. Cl. ........................................ 55/357; 55/302; 55/378; 55/341 R; 55/498; 55/504; 55/502; 49/463
[58] Field of Search ...................... 55/341 R, 378, 379, 55/302, 478, 480, 481, 493, 507, 509, 504, 357, 498, 502; 49/463

[56] References Cited

U.S. PATENT DOCUMENTS

| 3,788,406 | 1/1974 | Kaeppler et al. | 55/341 R |
| 4,158,554 | 6/1979 | Bundy et al. | 55/379 |
| 4,218,227 | 8/1980 | Frey | 55/484 |
| 4,264,345 | 4/1981 | Miller | 55/484 |

FOREIGN PATENT DOCUMENTS 2384425 11/1978 France .................................. 55/504
861075 2/1961 United Kingdom ................. 55/379

Primary Examiner—Bernard Nozick
Attorney, Agent, or Firm—Lyon & Lyon

[57] ABSTRACT

Disclosed herein is a locking mechanism for releasably mounting a row of filter elements in sealing engagement within a filter assembly. The locking mechanism includes a pair of spaced longitudinal bars, substantially semicircular in cross section, which are pivotly mounted within the filter assembly below the lateral edges of mounting plates affixed to the upper ends of the filter elements such that a row of filter elements depend from and are slideably removeable along the longitudinal flat side of the spaced parallel bars. A locking handle is affixed to the outwardly extending ends of each of the parallel bars such that rotation of the handle causes the curvilinear surface of the parallel bars increasingly to bear against the underside of the mounting plate and urge said filter element upwardly into said sealing engagement with an interior portion of the filter assembly.

3 Claims, 7 Drawing Figures

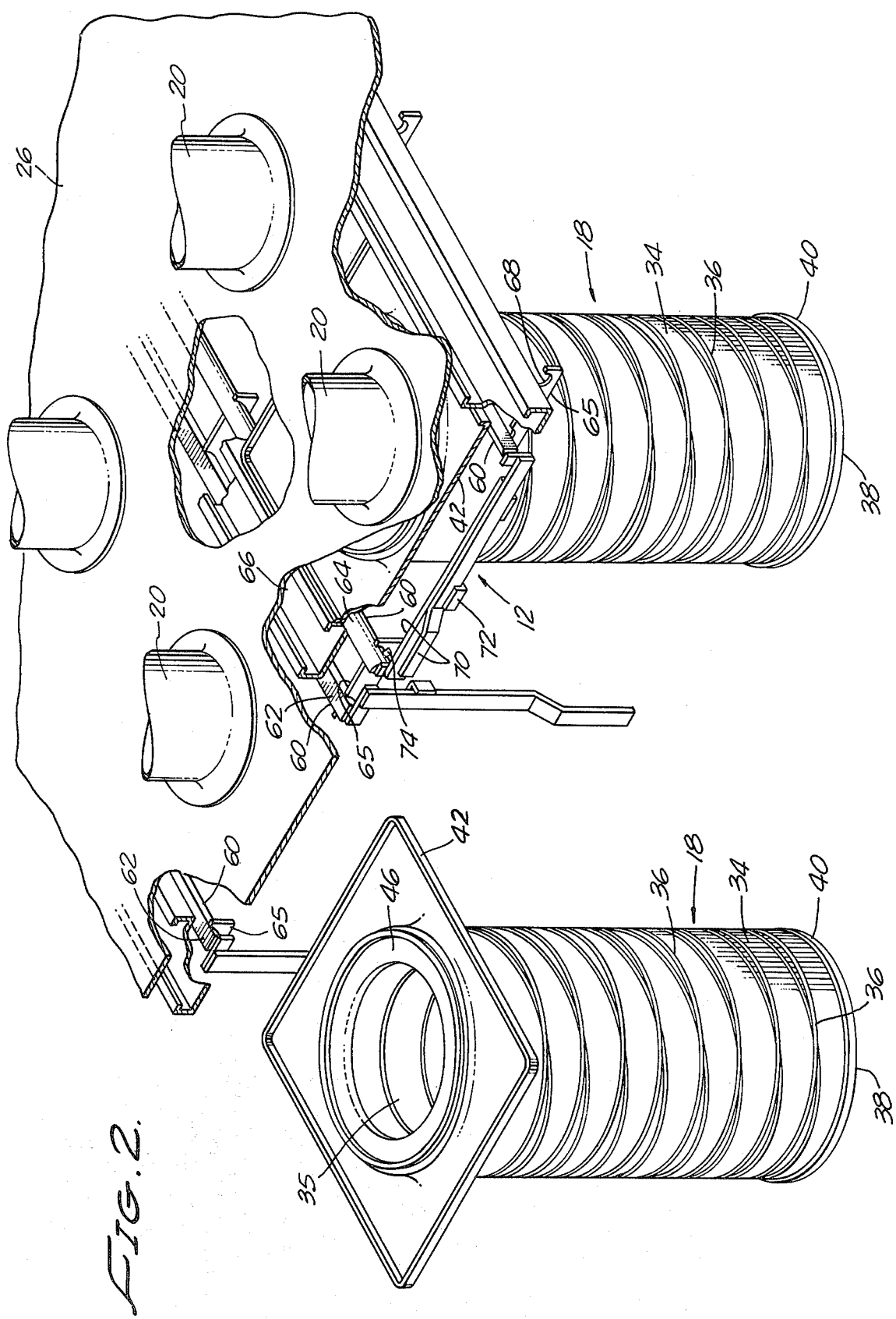

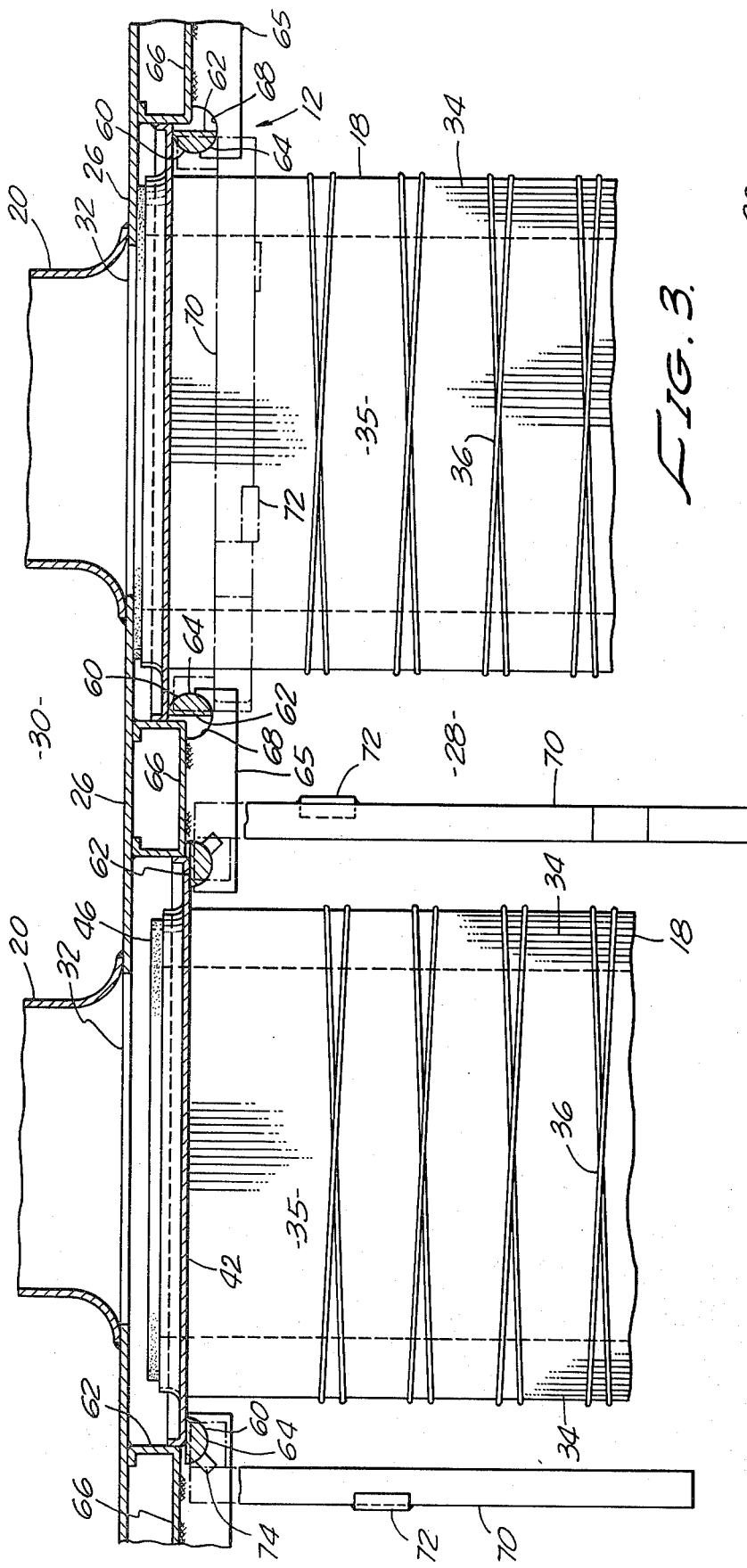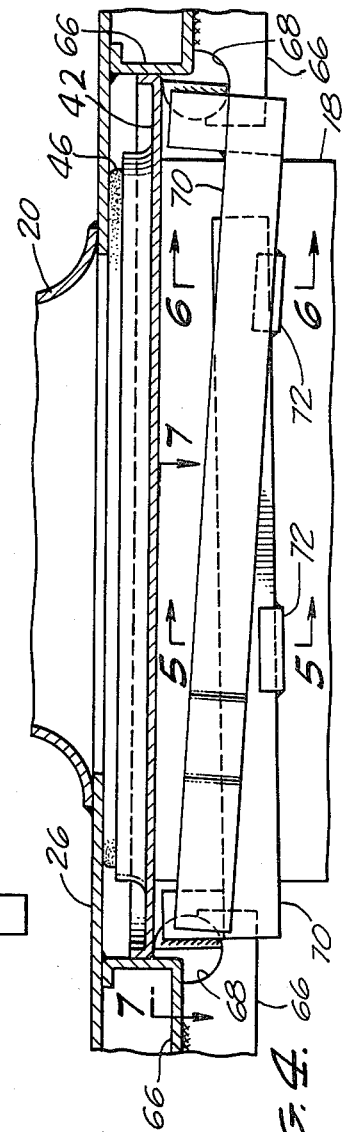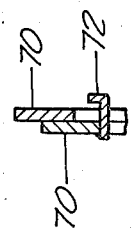

FILTER ELEMENT LOCKING MECHANISM

BACKGROUND OF THE INVENTION

The present invention relates to a locking mechanism for releaseably mounting a row of filter elements in sealing engagement within a filter assembly or dust collector. The filter assembly for which this mechanism was particularly designed is of the back pulse self cleaning type similar in its general operation to that described in British Pat. No. 1,516,721 which, in turn, is quite similar in operation to the bag house filter assemblies which have been known for many years.

The more recent filter assemblies of this type comprise a large housing which is partitioned into a lower dirty air portion and an upper clean air portion. A plurality of rows of cylindrical pleated filter elements are removeably mounted in the lower portion of the housing such that the open upper end of the filter elements are in sealing engagement with the partition between the upper and lower portions of the housing. Apertures are provided in the partition in axial alignment with the open end of the secured filter element communicating the interiors of the filter elements with the upper clean air portion of the housing. Dust laden air is directed into the lower portion of the housing where it passes through the walls of the filter element, depositing its dust, and upwardly through the interior of the filter element into the clean air portion of the housing. The air is then exhausted through an air outlet whereupon the exiting clean air can be recirculated for ventilation, directed to the air intake of a large gas turbine or used for any number of purposes.

To prevent the individual filter elements in such an assembly from rapidly becoming overladen with dust particles, each filter element is repeatedly cleaned by back pulsing a jet of air downwardly through the interior of the filter element opposite to the direction of general air flow. This back pulsing forces the dust particles which have accumulated on the filter elements outwardly therefrom whereupon they fall to the bottom of the lower portion of the filter housing where they can be accumulated in a hopper for disposition. While such a cleaning technique vastly increases the useful life of the individual filter elements, they nevertheless require replacement which in such types of filter assemblies has heretofore been a quite dirty and time consuming operation.

The mechanisms heretofore employed for removably securing the filter elements in place, such as that taught by British Pat. No. 2,516,721, are not only quite awkward to operate requiring an excessive expenditure of time and effort in the replacement of the individual filter elements, but are constructed such that each mechanism secures only a single filter element in place. The large number and awkward positioning of the individual filter elements in such filter assemblies together with such difficult locking mechanisms make filter replacement an extremely dirty and unpleasant job. Further problems are created when toxic materials are being filtered, as the person changing the filter must position himself beneath the filter element he is removing in the path of falling toxic dust particles. In addition, these filter assemblies are often used on the air inlet end of large gas turbines which must be shut down during filter replacement. For these reasons, it would be highly desirable to provide a mechanism for releasably mounting these filter elements in such filter assemblies which would facilitate filter replacement and alleviate the aforesaid problems. The invention disclosed herein provides such a mechanism.

SUMMARY OF THE INVENTION

Briefly, the present invention comprises a locking mechanism for releasably mounting a row of filter elements in a pulse cleaned cartridge filter house which facilitates filter element replacement. The locking mechanism includes a pair of elongated bars, each having a flat surface for supporting a row of filter elements such that the filter elements can be slidably moved along said bar for removal, and a curvilinear camming surface which, upon rotation of the bars, press the filter elements upwardly into a sealing engagement with the interior of the filter assembly. Means are provided for maintaining the bars in the locking position and thereby maintaining the filter elements in sealing engagement with the interior of the filter assembly.

It is the principal object of the present invention to provide an improved locking mechanism for releasably maintaining a plurality of depending filter elements in sealing engagement within a pulse cleaned cartridge house which minimizes the difficulty and time necessary for filter element replacement.

It is another object of the present invention to provide a locking mechanism for releasably maintaining a row of depending filter elements in sealing engagement within a pulse cleaned cartridge filter house which is simple to operate and minimizes the chance for air leakage therethrough.

It is yet another object of the present invention to provide a locking mechanism for releasably maintaining a row of depending filter elements in a sealing engagement within a filter assembly which allows the filter elements to be easily removed from a position alongside the filter elements out of the path of free falling dust particles.

It is still a further object of the present invention to provide a locking mechanism for releasably maintaining a row of depending filter elements in sealing engagement within a filter assembly which is of simple construction and is economical to manufacture.

These and other objects and advantages will become apparent from the following detailed description taken in conjunction with the accompanying drawings.

IN THE DRAWINGS

FIG. 2 is a perspective view of a portion of the filter assembly illustrating locking mechanisms for two rows of filter elements. One of the locking mechanisms is in the open position and the other is in the closed position securing a row of filter elements in sealing engagement with the interior of the filter assembly.

FIG. 3 is a sectional side view of the locking mechanisms for two rows of filter elements illustrating the mechanisms in both the open and closed position and supporting the rows of filter elements thereon.

FIG. 4 is an enlarged sectional side view of the locking mechanism illustrating the release of the interlocking arm portions thereof.

FIG. 5 is a sectional view taken along line 5—5 of FIG. 4.

FIG. 6 is a sectional view taken along line 6—6 in FIG. 4.

DESCRIPTION OF THE PREFERRED EMBODIMENT

Figure 1:
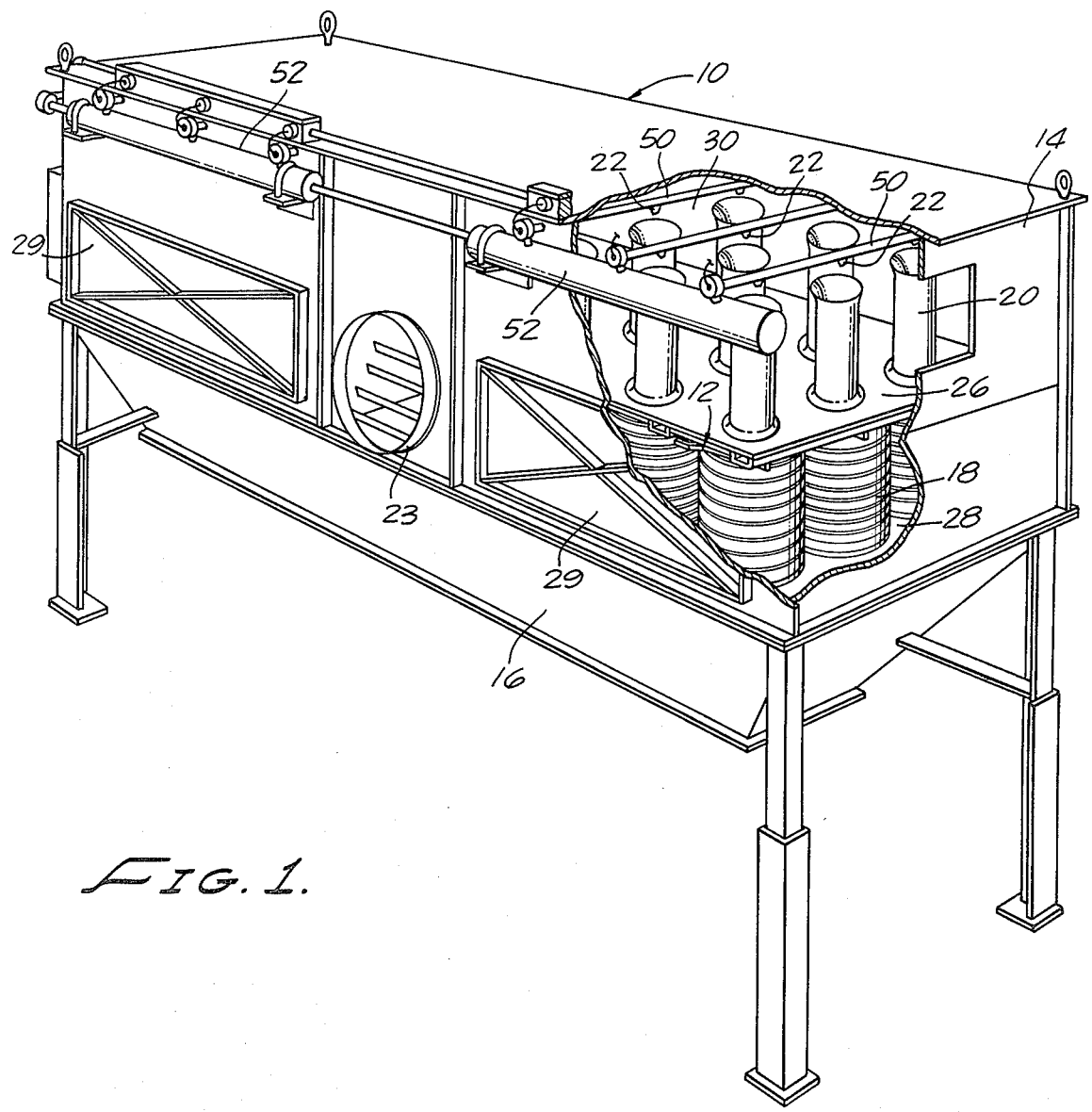
FIG. 1 is a partial sectional view of a filter assembly employing the present invention.
Figure 7:
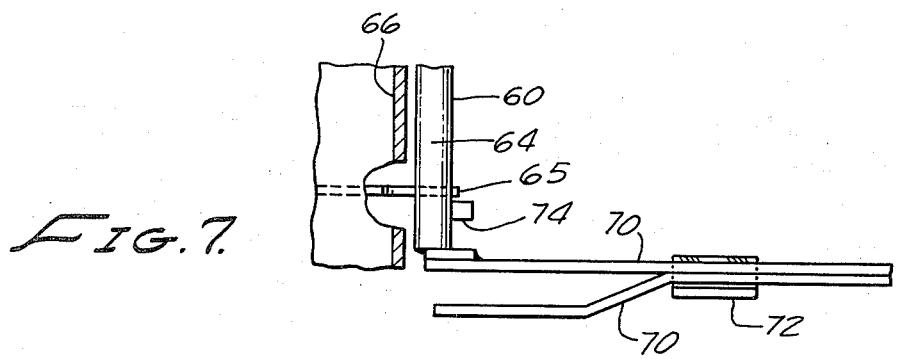
FIG. 7 is a sectional view taken along line 7—7 in FIG. 4.

Referring now in detail to the drawings, a pulse cleaned cartridge filter assembly 10 of the type for which the locking mechanism 12 of the present invention was developed, is illustrated in FIG. 1. As seen therein, the filter assembly is comprised of a large housing 14, a lower hopper 16 for collecting the filtered dust or other foreign matter, a plurality of cylindrical pleated filter elements 18, in a corresponding plurality of ejector tubes 20 and back pulsing nozzles 22. The filter housing 14 has a lower air inlet 23, an upper air outlet (not shown) and the interior thereof is partitioned by horizontal partition or diaphragm plate 26 into a lower dirty air chamber 28 and upper clean air chamber 30. The filter assembly has doors 29 therein providing access to the lower chamber and the filter elements mounted therein. The lower chamber 28 is opened at its lower end so that foreign matter filtered from the air can fall freely into the hopper 16. The lower chamber communicates with the upper chamber through a plurality of apertures 32 in the diaphragm plate 26 (see FIG. 3).

The filter elements 18 which are mounted within the lower chamber 28 and held against the diaphragm plate 26 by the locking mechanism 12 such that they depend from the diaphragm plate, are comprised of pleated paper filter media 34 which is formed into a cylindrical configuration to define a hollow interior 35. The media can be supported in this configuration by a double helical wrap 36 around the outer surface of the media with twine which has been precoated with a suitable adhesive. Of course, other means of supporting the pleated filter media could also be employed. The lower ends 38 of the filter elements are sealed by end plates 40 and a mounting plate 42 is secured about the open upper end of the filter elements. A suitable gasket 46 is secured to the mounting plate about the open upper end of the filter elements for effectuating an air tight seal with the diaphragm plate 26 when the filter element is pressed thereagainst by the locking mechanism 12.

A plurality of ejector tubes 20 are secured to the diaphragm plate 26 directly above the apertures 32 therein so that the air passing through the pleated walls of the filter elements 18 flows upwardly through the interior of the filter element, through the apertures 32 in the diaphragm plate, through the ejector tube 20 and into the clean air chamber or plenum 30. Disposed directly above the open ends of the ejector tubes are a plurality of air nozzles 22. These nozzles depend from blow pipes 50 which are in fluid communication through manifolds 52 with a supply of pressurized air.

In operation, dust laden air is forced into the lower chamber 28 of the filter housing 14 where it is directed by baffles or other suitable manifold means (not shown) to the cylindrical filter elements 18. As the air passes through the pleated filter media and into the interior of the filter elements, the dust and other foreign matters carried thereby is filtered from the air flow. The clean air passes upwardly through the ejector tubes into the upper clean air chamber 30 and exits the filter housing through the clean air outlet.

To remove the accumulated foreign matter from the walls of the filter elements, the air nozzles 22 carried by blow tubes 50 are periodically activated to emit pulses of air which pass downwardly through the ejector tubes. The configuration of the ejector tubes is such that a considerable volume of surrounding air is pulled down the tubes into the interior of the filter elements which forces the foreign matter outwardly from the filter element from where it merely falls under the force of gravity into the hopper 16. However, some of the dust does accumulate on the walls of the filter elements despite the back pulsing which requires that the filter elements be periodically replaced.

The locking mechanism 12 by which the filter elements 18 are releasably held in sealing engagement with the underside of the diaphragm plate 26 about apertures 32 therein is comprised of a plurality of pairs of locking bars 60 with each pair of bars supporting a row of filter elements. In the embodiment of the filter assembly shown in the drawings there are two groupings of filter elements, one grouping disposed on each side of the centrally disposed housing air inlet 23. Each group of filter elements is divided into three rows with three filter elements being in each row. Accordingly, each pair of locking bars 60 support one row of three filter elements.

Each locking bar is substantially semi-circular in cross-section defining a flat supporting surface 62 and a curvilinear camming surface 64. The locking bars are carried by a plurality of support brackets 65 which are welded or otherwise rigidly affixed to transverse beams 66 which depend on the underside of the diaphragm plate 26 as seen in the drawings. Each bracket defines at least one trough 68 within which the locking bar rests. In the embodiment shown in the drawings, all but the outermost support brackets define a pair of troughs for supporting adjacent locking bars and each pair of locking bars is supported by such brackets spaced longitudinally along the locking bars and between the filter elements as best seen in FIG. 2. A locking handle 70 is affixed to the ends of each of the locking bars such that the handle extends perpendicularly from the longitudinal axis of the locking bars and the plate defined by the flat supporting surfaces thereof.

As seen in FIGS. 2 and 3, with the locking handles 70 hanging downwardly, the underside of the mounting plate 42 on the upper ends of the filter elements 18 rests on the flat supporting surfaces 62 of the locking bars 60. In this position, the filter elements can be slid along the locking bar and out of the filter housing for replacement. To secure the filter elements in place, the locking handles 70 are rotated to the horizontal position illustrated in FIG. 3. As illustrated in FIG. 3, and in dotted lines in FIG. 4, rotation of the locking handles to the horizontal position causes the curvilinear camming surface 64 of the locking bar increasingly to bear against the underside of the mounting plate forcing the filter element upwardly into sealing engagement with the underside of diaphragm 26. "L"-shaped supporting brackets 72 are welded to the locking handles adjacent the lower edges thereof such that upon disposing the locking handles 70 of a pair of locking bars into the horizontal position such that each handle rests with the "L"-shaped supporting bracket of the adjacent handle, the handles are prevented from inadvertently rotating back to the open position. Stops 74 are preferably provided on the locking bars 60 adjacent the supporting brackets 65 to prevent the bars 60 from being inadvertently pulled from the filter housing.

To open the locking mechanism, one of the handles is raised slightly upwardly so that it clears the supporting bracket of the other handle, whereupon the raised handle can be lowered to the open position. This slight raising of one of the locking handles is illustrated in FIGS. 4-6.

Through the aforesaid assembly, a row of filter elements can be simply and quickly replaced in a single operation by merely removing the locking handles from the "L"-shaped supporting bracket and rotating the adjacent handles to the vertical position and sliding the filter elements along the flat supporting surfaces of locking bars outwardly of the housing. This operation can be accomplished by a person positioned to the side of the filter elements out of the path of falling dust particles. Similarly, a row of new filter elements can be quickly and simply secured in place in a single operation by sliding the new elements along the flat surfaces of the locking bars into proper alignment with the apertures in the diaphragm plate and rotating the handles back to the closed position whereupon the filter elements are cammed by the curvilinear surface of the locking bars upwardly into sealing engagement with the diaphragm plate.

Various changes and modifications may be made in carrying out the present invention without departing from the spirit and scope thereof. Insofar as these changes and modifications are within the purview of the appended claims, they are to be considered as part of the present invention.

We claim:

1. A locking mechanism for releasably mounting a plurality of depending separate filter elements in sealing engagement with a partition in a filter housing about a corresponding plurality of flow through apertures in the partition, said locking mechanism comprising: a pair of elongated locking bars, each of said bars being substantially semi-circular in cross-section and defining an elongated substantially flat supporting surface and an elongated curvilinear camming surface; a plurality of locking bar supporting brackets mounted within said filter housing for rotatably mounting said locking bars about the central longitudinal axes thereof along opposite sides of said filter elements and under portions thereof such that said filter elements are dependent from and slidably moveable along said substantially flat supporting surfaces; a handle secured to the extended ends of each of said locking bars and extending therefrom substantially perpendicular with respect to the plane of said elongated supporting surfaces such that upon bringing said handles into a parallel and overlapping relationship, said curvilinear camming surfaces bear against said portions of said filter elements, urging each of said filter elements into sealing engagement with said partition about said apertures; and a substantially "L"-shaped supporting bracket rigidly affixed to each of said handles such that upon bringing said handles such that upon bringing said handles into said parallel and overlapping relationship, each of said handles is supported by the bracket secured to the other handle whereby said handles are held together in said parallel and overlapping relationship.

2. A locking mechanism for releasably mounting a plurality of rows of separate depending filter elements in sealing engagement with a partition in a filter housing about a corresponding plurality of rows of flow through apertures in the partition, said locking mechanism comprising: a plurality of pairs of elongaed locking bars, each of said bars being substantially semi-circular in cross-section and defining an elongated substantially flat supporting surface and an elongated curvilinear camming surface; a plurality of depending locking bar supporting brackets rigidly mounted within said filter housing for rotatably (one) each of said locking bars about the central longitudinal axes thereof along each side of each of said rows of filter elements and under portions thereof such that each of said (rows of) filter elements in each of said rows thereof are independently dependent from and slidably moveable along the support surfaces defined by a pair of said locking bars, each of said backets receiving a transverse portion of at least one of said locking bars and a pair of said brackets being disposed adjacent and between each of said filter elements; a handle secured to the extended end of each of said locking bars and extending therefrom substantially perpendicular with respect to the plane of said elongated supporting surfaces such that upon bringing the handles secured to the pairs of locking bars into overlapping and parallel relationships, said curvilinear camming surfaces bear against said portions of said filter elements urging each of said filter elements into sealing engagement with said partition about said apertures; and means for locking said handles in said parallel and overlapping relationships.

3. A locking mechanism for releasably mounting a plurality of rows of separate depending filter elements in sealing engagement with a partition in a filter housing about a corresponding plurality of rows of flow through apertures in the partition, said locking mechanism comprising: a plurality of pairs of elongated locking bars, each of said bars being substantially semi-circular in cross-section and defining an elongated substantially flat supporting surface and an elongated curvilinear camming surface; a plurality of depending locking bar supporting brackets rigidly mounted within said filter housing for rotatably mounting each of said locking bars about the central longitudinal axes thereof along each side of each of said rows of filter elements and under portions thereof such that each of said filter elements in each of said rows thereof are independently dependent from and slidably moveable along the support surfaces defined by a pair of said locking bars, each of said brackets receiving a transverse portion of a least one of said locking bars and a pair of said brackets being disposed adjacent and between each of said filter elements; a handle secured to the extended end of each of said locking bars and extending therefrom substantially perpendicular with respect to the plane of said elongated supporting surfaces such that upon bringing the handles secured to the pairs of locking bars into overlapping and parallel relationships, said curvilinear camming surfaces bear against said portions of said filter elements urging each of said filter elements into sealing engagement with said partition about said apertures; and a substantially "L"-shaped supporting bracket rigidly affixed to each of said handles such that upon bringing said handles into said parallel and overlapping relationship, each of said handles is supported by the bracket secured to the other handle whereby said handles are held together in said parallel and overlapping relationship.

* * * * *